(12) United States Patent
Bagley

(10) Patent No.: US 7,835,421 B1
(45) Date of Patent: Nov. 16, 2010

(54) ELECTRIC DETECTOR CIRCUIT

(76) Inventor: Geoffrey Charles Bagley, 49 Green Lane, Malvern Wells, Worcestershire (GB)

( * ) Notice: Subject to any disclaimer, the term of this patent is extended or adjusted under 35 U.S.C. 154(b) by 0 days.

(21) Appl. No.: 07/475,079

(22) Filed: Jan. 22, 1990

Related U.S. Application Data

(63) Continuation of application No. 06/561,831, filed on Dec. 9, 1983, now abandoned.

(30) Foreign Application Priority Data

Jan. 4, 1983 (GB) .................. 8300076

(51) Int. Cl.
*H04B 1/707* (2006.01)
(52) U.S. Cl. .................. 375/142; 375/140; 342/192
(58) Field of Classification Search .................. 375/1, 375/130, 140, 142, 2.2, 96, 97; 380/34; 342/189, 342/192; 370/69.1; 329/145; 455/202
See application file for complete search history.

(56) References Cited

U.S. PATENT DOCUMENTS

| | | | | |
|---|---|---|---|---|
| 4,088,833 A | * | 5/1978 | Godard et al. | 375/96 |
| 4,122,393 A | * | 10/1978 | Gordy et al. | 375/1 |
| 4,253,189 A | * | 2/1981 | Lemoussu et al. | 375/96 |
| 4,255,791 A | * | 3/1981 | Martin | 375/1 |
| 4,312,072 A | * | 1/1982 | Vogel | 375/1 |
| 4,336,616 A | * | 6/1982 | Carson et al. | 455/202 |
| 4,361,891 A | * | 11/1982 | Lobenstein et al. | 375/142 |
| 4,385,401 A | * | 5/1983 | Jagnow et al. | 375/1 |
| 4,392,231 A | * | 7/1983 | Henry | 375/1 |
| 4,433,422 A | * | 2/1984 | Kurth | 375/96 |
| 4,490,829 A | * | 12/1984 | Van Etten | 375/1 |
| 4,512,013 A | * | 4/1985 | Nash et al. | 370/69.1 |
| 4,532,635 A | * | 7/1985 | Mangulis | 375/1 |
| 4,532,636 A | * | 7/1985 | Wilkinson | 375/1 |
| 4,538,281 A | * | 8/1985 | Rajan | 375/2.2 |
| 4,561,089 A | * | 12/1985 | Rouse et al. | 375/1 |
| 4,567,588 A | * | 1/1986 | Jerrim | 375/1 |
| 4,583,231 A | * | 4/1986 | Puckette | 375/1 |
| 4,601,047 A | * | 7/1986 | Horwitz et al. | 370/479 |

OTHER PUBLICATIONS

"Digital Communications", by Spilker, Jr., (1997), p. 302.*

* cited by examiner

*Primary Examiner*—Isam Alsomiri
(74) *Attorney, Agent, or Firm*—Oliff & Berridge, PLC

(57) ABSTRACT

A detector is provided for determining the carrier frequency of symmetrical, direct sequence, spread spectrum (DSSS) signals. The DSSS signal is divided between two signal paths, one path containing a frequency band inverter and the other a time delay unit. The outputs of the inverter and delay unit are connected to a multiplier and thence to a filter isolating the difference frequency of the inverted and non-inverted DSSS signals. The frequency inverter comprises an input band pass filter, a local oscillator, a second multiplier and a band pass filter. Frequency inversion is carried out by the multiplier and filter providing the difference signal between the local oscillator signal and the DSSS signal. The difference frequency provided by the filter is the known local oscillator frequency minus twice the DSSS carrier frequency.

6 Claims, 3 Drawing Sheets

US 7,835,421 B1

ELECTRIC DETECTOR CIRCUIT

This is a continuation of application Ser. No. 06/561,831, filed Dec. 9, 1983, now abandoned.

BACKGROUND OF THE INVENTION

The invention relates to an electronic circuit for detection of direct-sequence, spread-spectrum signals (hereinafter called "DSSS signals") having frequency spectra which are symmetrical about the suppressed carrier frequency.

Symmetric DSSS signals are among those used for communication purposes. They may be produced by modulating a narrow band signal by binary phase shift keying (PSK) in accordance with a pseudo-random binary sequence. This produces a wide-band, suppressed carrier, double side-band signal. Detection of such a signal is extremely difficult when it is obscured by noise.

Applicant is aware of U.S. patent application Ser. No. 445,646 dated the 30th of Nov. 1982, (Van Etten), an abstract of which was made available to the public after Applicant's priority date in Profile 1643/04/0021 (GRA Vol 83 Issue 12: Accession No AD-D010 037(0). Van Etten describes a technique for detecting the amplitude modulation of spread-spectrum signals by compressing the signal into a narrower bandwidth. The signal is divided between two paths and mixed with an upper sideband signal in one path and with a lower sideband signal in the other path. The upper and lower sideband signals are the sum and difference frequencies of two local oscillators, the first of which produces a signal estimated to have the same frequency as the carrier signal of interest, ie it is the listening frequency. The second local oscillator signal has a frequency higher than the bandwidth of the listening frequency. The two signals produced by mixing with the upper and lower sideband signals are mixed together. This further mixing produces an output signal which consists of the square of the amplitude modulation of the original carrier signal modulated at twice the frequency of the second local oscillator signal. Any offset between the listening and carrier frequencies disappears, and so also does any phase or frequency modulation of the carrier. However, the output signal is independent of the carrier frequency provided that the latter is within the system bandwidth, and accordingly the carrier frequency is not detected.

It is an object of the present inventions to provide a detector for determining the carrier frequency of symmetrical DSSS signals.

SUMMARY OF THE INVENTION

The present invention provides a detector for determining the carrier frequency of a symmetrical DSSS signal, and includes means for frequency inverting such a signal together with means for synchronously correlating the inverted and non-inverted signals. Correlation produces a beat frequency signal from which the required carrier frequency may be determined.

The frequency inversion may be performed with a local oscillator, a frequency mixer and a filter providing a difference frequency between the oscillator and DSSS signals. Correlation may be carried out by a mixer for the inverted and non-inverted signals and a filter to isolate correlated signals. The correlating filter may be a phase-locked loop, a band-pass filter or a spectrum analyser. Frequency determination may be achieved by a continuous wave radio receiver, a frequency meter or by the aforesaid spectrum analyser.

BRIEF DESCRIPTION OF THE DRAWINGS

In order that the invention might be more fully understood, one embodiment thereof will now be described, by way of example only, with reference to the accompanying drawings, in which.

DETAILED DESCRIPTION OF THE DRAWINGS

Figure 1:
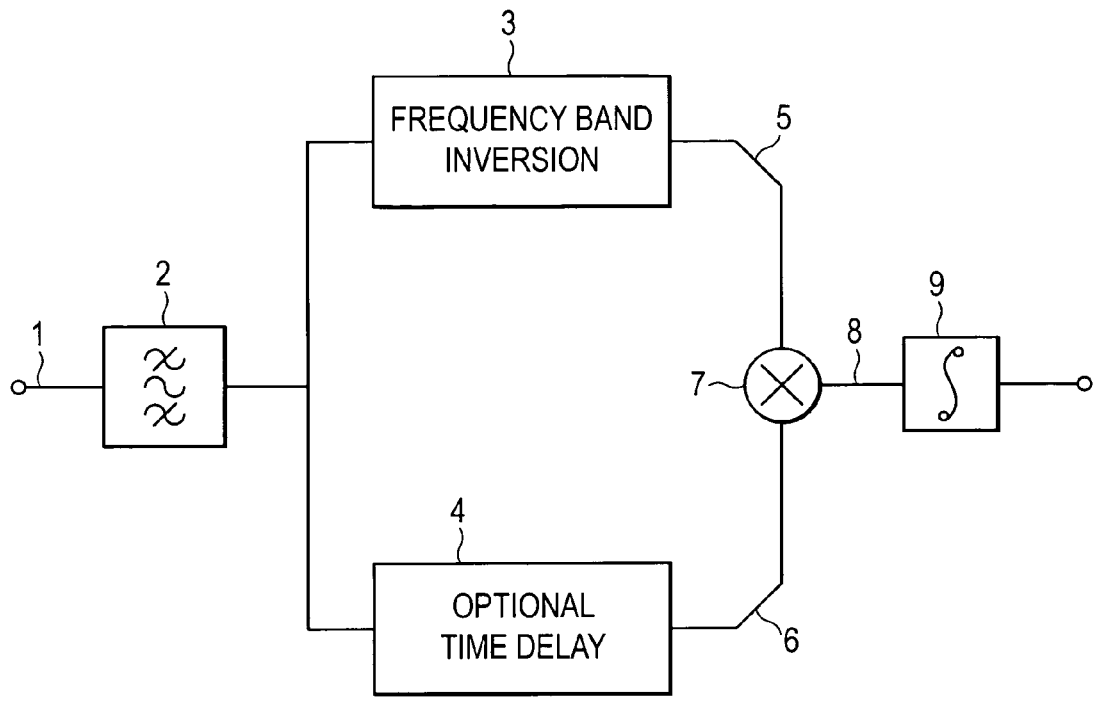
FIG. 1 is a schematic circuit diagram of a detector circuit of the invention.
Figure 2:
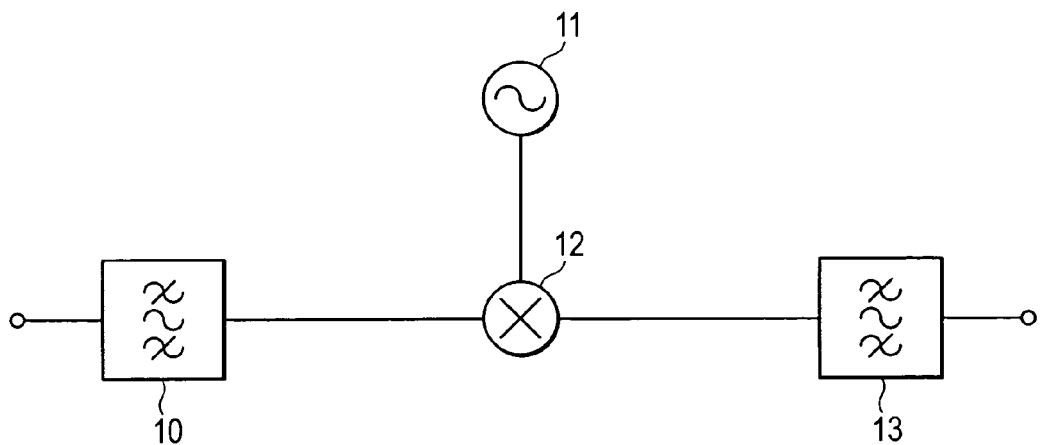
FIG. 2 illustrates frequency inversion using a mixer for the purposes of detection in accordance with the invention, and FIG. 3 gives details of waveforms relevant to detection in accordance with the invention.

Referring to FIGS. 1 and 2, an input terminal 1 is connected to a band-pass filter 2 and thence to a parallel arrangement of a frequency band inverter 3 and time delay unit 4. The inverter 3 and delay unit 4 are connected by lines 5 and 6 to a multiplier 7 having an output line 8 to a filter 9. As shown in FIG. 2, the inverter 3 comprises an input band-pass filter 10 and an oscillator 11 both connected to a multiplier 12 and thence to an output band pass filter 13.

Figure 3:
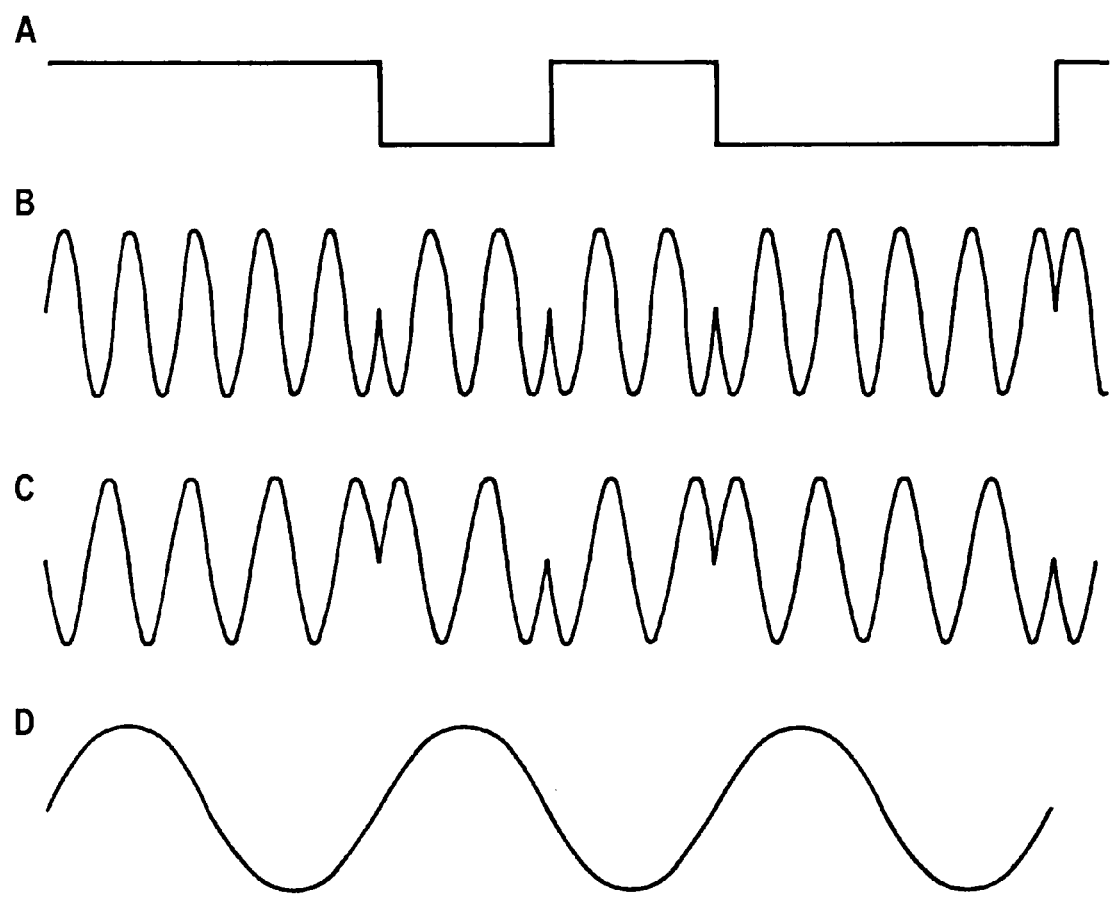

Referring now also to FIG. 3, curve a is a pseudo-random binary signal for modulation of other signals by phase-shift keying (PSK). Curves b and c are PSK-modulated narrow band signals before and after frequency inversion. Curve d shows the beat frequency signal resulting from multiplication or correlation of curves b and c.

The arrangement described in FIGS. 1 and 2 operates as follows. A symmetrical DSSS signal applied to the input terminal 1 is filtered and fed to the inverter 3 and delay unit 4 in parallel. In the inverter 3, the signal is filtered once more and multiplied or mixed with the output of the oscillator 11 by the multiplier 12. The oscillator frequency is arranged to be higher than the largest frequency in the DSSS signal of interest, and mixing produces sum and difference frequencies. The band-pass filter 13 is arranged to filter out the sum frequency. The difference frequency is a frequency-inverted version of the original DSSS signal. The multiplier 7 multiplies the difference frequency on line 5 (curve c) with the time-delayed signal (curve b) on line 6 to produce the curve d signal. The delay unit 4 is adjusted to correct for any delay occurring in frequency inversion by synchronising the inverted and non-inverted signals. The output of the multiplier 7 is integrated by the filter 9.

Let the original DSSS signal be $f(t)\cos \omega_1 t$, where $\omega_1$ is the suppressed carrier angular frequency and $f(t)$ is the PSK spreading function having values $\pm 1$. If the local oscillator angular frequency is $\omega_2$, then the inverted signal is $f(t)\cos(\omega_2-\omega_1)t$. The output $M_o$ of multiplier 7 is accordingly:

$$M_o[f(t)\cos \omega_1 t] \times [f(t)\cos(\omega_2-\omega_1)t]$$

This reduces to a pure sine wave beat frequency signal $\cos(\omega_2-2\omega_1)t$ (curve d) plus other components and noise, since $[f(t)]^2=1$, $f(t)$ having $\pm 1$ values only. The local oscillator frequency $\omega_2$ is known, and hence the carrier frequency $\omega_1$ may be determined from the beat frequency $(\omega_2-2\omega_1)$. Noise components are wideband, falling largely outside the bandwidth of the filter 9, and are rejected. The combination of the multiplier 7 and intergrating filter 9 constitute a correlator, since the original DSSS signal is correlated with a frequency inverted version of itself; other components, such as noise, which are uncorrelated by frequency inversion are rejected.

The filter 9 also includes processing means (not shown) to remove unwanted cross-product components arising from the multiplication by multiplier 7. A phase-locked loop, multiple band-pass filters or a proprietary spectrum analyser may be used as the filter 9. The continuous wave signal (curve d) or DSSS carrier frequency may be detected by the aforesaid spectrum analyser, or by a frequency meter or other conventional means.

The invention is a form of self-correlation of a signal with a frequency-inverted version of itself. Asymmetric signals and noise are uncorrelated with respect to frequency inversion, and are rejected.

Figure 4:
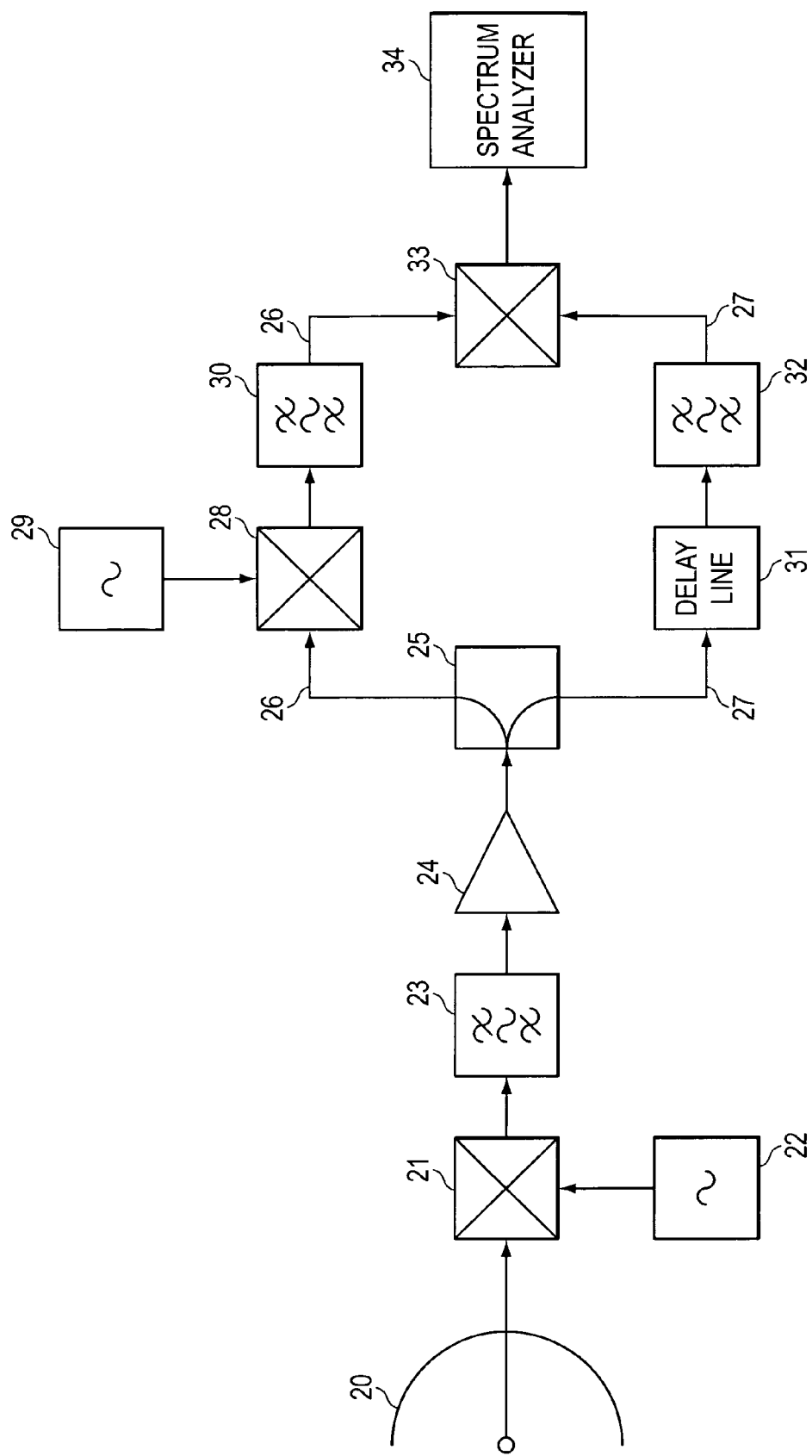
FIG. 4 is a more detailed version of the circuit of FIG. 1.

Referring now to FIG. 4, there is shown a block diagram of a more detailed version of the circuit described with reference to FIGS. 1, 2 and 3. An antenna 20 is arranged to receive signals in the 4.0±0.02 GHz band, and to supply the signals to a mixer 21 connected to a 4.07 GHz stable microwave oscillator 22. The mixer 21 mixes the antenna and oscillator signals, and a band pass filter 23 provides the difference signal in the 70±20 MHz band. The filter output is fed via an intermediate frequency (IF) amplifier 24 to a power splitter 25 feeding two signal paths 26 and 27. The signal in path 26 is mixed by a mixer 28 with the 250 MHz signal from a stable local oscillator 29, and is then filtered by a band-pass filter 30 centred at 180 MHz to isolate the difference frequency.

The signal in path 27 passes via a delay line 31 to a band pass filter 32 centred at 70 MHz. The signals in the paths 26 and 27 are fed from the respective filters 30 and 32 to a mixer 33, which passes inter alia their difference frequency 110±40 MHz to a spectrum analyser 34. The delay line 31 equalises the signal delays in the paths 26 and 27 to synchronise appearance of signals at the mixer 33.

The arrangement of FIG. 4 operates as follows. Consider a DSSS signal having a carrier frequency of 4.0 GHz+δf MHz, where −20 MHz<δf<+20 MHz, ie the DSSS signal is within the bandwidth of the antenna 20. This signal will become 70+δf MHz at the output of the microwave mixer 23, 180−δf MHz at the output of the mixer 28, and 110−2 δf MHz at the output of the final mixer 33 or as detected by the spectrum analyser. Accordingly, a DSSS signal within 20 MHz of 4.0 GHz will produce a signal at the spectrum analyser 34 separated from 110 MHz by twice its separation from 4.0 GHz, the separations being in the opposite sense to one another.

The invention claimed is:

1. A detector for determining the carrier frequency of a symmetrical, direct sequence, spread spectrum (DSSS) signal of the kind having a frequency spectrum which is symmetrical about a suppressed carrier frequency the detector including:
    (1) means for subtracting the DSSS signal from a signal having higher frequency than any frequency in the DSSS signal spectrum and for producing a frequency inversion of the DSSS signal spectrum,
    (2) means for correlating the inverted and non-inverted DSSS signals at substantially zero relative time delay, and
    (3) means for identifying the suppressed carrier frequency of the DSSS signal from the output of the correlating means.

2. A detector according to claim 1 wherein the means for producing frequency inversion of the DSSS signal spectrum includes a local oscillator and a first frequency mixer arranged to provide a difference signal between the local oscillator output and the DSSS signal.

3. A detector according to claim 2 including delaying means arranged to produce substantially zero relative line delay between the inverted and non-inverted DSSS signals, a second mixer arranged to multiply together the inverted and non-inverted signals, and a filter arranged to integrate the second mixer output to provide the difference frequency of the multiplied signals.

4. A detector according to claim 3 wherein the filter is a spectrum analyser.

5. A detector according to claim 3 including a third mixer and a second local oscillator arranged to provide an intermediate frequency difference signal between the DSSS signal and the second local oscillator signal, the third mixer output being connected to the means for producing frequency inversion of the DSSS signal spectrum.

6. A method of detecting the carrier frequency of a DSSS signal including the steps of:
    subtracting the DSSS signal from a signal having a higher frequency than an frequency in the DSSS signal spectrum to produce DSSS signal frequency spectrum inversion;
    correlating the inverted and non-inverted DSSS signals at substantially zero relative time delay; and
    identifying the said carrier frequency from the correlation signal.

* * * * *